Dec. 29, 1964 J. M. CLUWEN 3,163,773

CIRCUIT ARRANGEMENT FOR LIMITING ELECTRICAL SIGNALS

Filed May 6, 1960

INVENTOR
JOHANNES MEYER CLUWEN
BY Frank R. Trifari
AGENT

United States Patent Office 3,163,773

Patented Dec. 29, 1964

3,163,773
CIRCUIT ARRANGEMENT FOR LIMITING ELECTRICAL SIGNALS

Johannes Meyer Cluwen, Eindhoven, Netherlands, assignor to North American Philips Company, Inc., New York, N.Y., a corporation of Delaware Filed May 6, 1960, Ser. No. 27,307
Claims priority, application Germany May 9, 1959
6 Claims. (Cl. 307—88.5)

The present invention relates to circuit arrangements for limiting electrical signals supplied to a parallel resonant circuit which is connected in parallel with the emitter-collector path of a transistor, preferably a symmetrical transistor, a center-tap of the resonant circuit being connected to the base of the transistor by way of a RC-parallel connection passing the modulation frequencies. Such a circuit is disclosed in copending U.S. application Serial No. 778,360, filed December 5, 1958, now Patent No. 3,047,740. This circuit arrangement suffers from a limitation in that the resonant circuit is liable to be damped excessively by the transistor, which is undesirable in particular with regard to small incoming signals. The invention is characterized in that a constant voltage is set up in the reversal direction in the circuit between the center-tap and the base, which results in reducing the rest-state damping of the resonant circuit with regard to insufficiently large signals.

Figure 1:
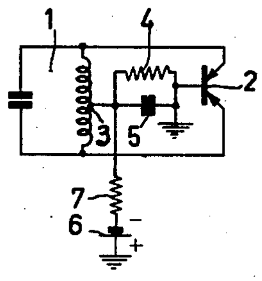
Figure 2:
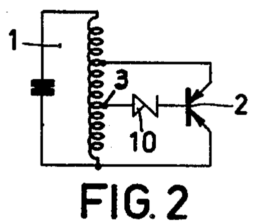
Figure 3:
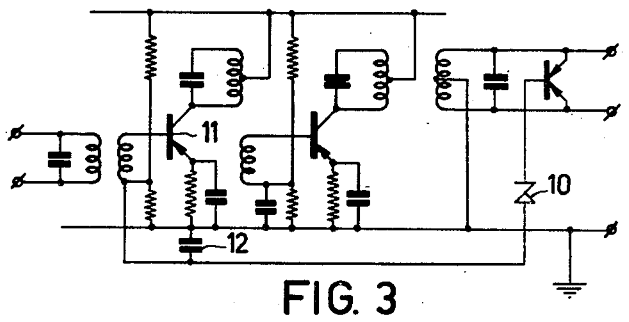
Figure 4:
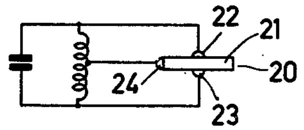

In order that the invention may be readily carried into effect, an example will now be described in detail with reference to the accompanying drawing, in which FIG. 1 shows a basic circuit diagram according to the invention, FIG. 2 shows a variation of the circuit arrangement represented in FIG. 1, FIG. 3 shows the circuit arrangement of FIG. 2 used in a radio receiver, and FIG. 4 shows a particular form of the circuit arrangement shown in FIG. 2.

The oscillations to be limited are supplied to a parallel resonant circuit 1 of high quality. The emitter-collector path of a transistor 2, in particular a symmetrical junction transistor, is connected in parallel with the circuit 1. The term "symmetrical transistor" is to be understood to mean that the characteristics of the transistor remain unchanged upon interchanging the emitter-electrode and the collector-electrode. The circuit 1 comprises a center tap 3 which is connected to the base of the transistor 2 through the parallel-connection of a resistor 4 and a capacitor 5. The time constant of the RC-parallel connections has a sufficient value for this parallel-connection to pass the modulation frequencies. Consequently, a bias voltage corresponding to the average signal amplitude is produced across the RC-parallel connection 4–5, in a direction opposite to the pass through direction of the base electrode. Amplitude variations of the signal, which exceed this bias, produce considerable current variations through the emitter-collector path of the transistor, by which the circuit 1 is damped to such a degree as to suppress these variations.

In practice, the resistor 4 is given such value as to produce such a base-current through the transistor 2 at the average signal amplitude that the current variations corresponding to the amplitude modulation to be suppressed remain smaller than said base-current. However, this base-current causes a considerable rest-state damping of the circuit 1. According to the invention, said rest-state damping is reduced by applying a further voltage to the circuit between the center tap 3 and the base of the transistor 2 with a polarity reversed to the pass-through direction of said base.

In FIG. 1, this is secured by applying to said circuit an additional current from a separate supply 6 through a resistor 7. The rest-state damping of the signals of insufficient strength is consequently greatly reduced, since the source 6 already produces a part of the required bias across the resistor 4 so that the base-current through the transistor 2 may be smaller without adversely affecting the amplitude modulation suppression of the strong signals. The voltage of the source 6 preferably corresponds to the average signal strength while the ratio of the resistors 7 and 4 corresponds to the ratio between said average signal strength and the lowest signal strength to be limited.

In the circuit arrangement shown in FIG. 2, a Zener-diode 10 is substituted for the RC-parallel connection 4–5. The emitter-collector path of the transistor 2 is connected in parallel with part of the resonant circuit 1, the center tap 3 being chosen at the said point of this part. When half the voltage amplitude across said part exceeds the Zener voltage of the diode 10, breakdown occurs and the current through the transistor, which current damps the circuit 1, increases very rapidly. Since, however, only a very low current has to flow through the diode 10, there is no risk of overloading this diode. An effect similar to that obtained with the circuit elements 6 and 7 shown in FIG. 1 is secured by series-connection of the diode 10 and the RC-section 4 and 5 shown in FIG. 1.

In FIG. 3, the current through the Zener-diode is used for automatic gain control of a frequency-modulation radio receiving circuit arrangement. As a result of the abrupt increase in current through the diode, a base-current decrease is produced in the transistor 11, due to which the input internal resistance and consequently the amplification of the transistor 11 are changed so that the amplification decreases with an increase in input signals. According to FIG. 3, the transistor 11 is inserted in the intermediate-frequency amplifier. Alternatively, however, it may form part of the high-frequency part of the receiver.

The capacitor 12 may pass the undesired amplitude-modulation frequencies so as to obtain conventional automatic gain control. If it passes only the intermediate-frequency oscillations and consequently a signal varying in the rhythm of the modulation frequency is produced across said resistor 12, counter-modulation of the undesired amplitude-modulation is obtained simultaneously.

FIG. 4 shows a special circuit element 20 fulfilling the function of both the transistor 2 and the Zener-diode 10 shown in FIG. 2. It consists of a body 21 of semi-conducting material of one conductivity type carrying three electrodes 22, 23 and 24 of opposite conductivity type. The electrodes 22 and 23 preferably have the same surface area so as to have the properties of the emitter and of the collector of a symmetrical transistor. The breakdown voltage of the p-n-junction between the electrode 24 and the body 21 is lower than that of each of the junctions between the electrodes 22 and 23 respectively and the body 21. For this purpose, the conductivity of the electrode 24 may exceed that of the electrodes 22 and 23 respectively, and/or the body 21, in the proximity of the electrode 24, may have a conductivity exceeding that in the proximity of electrodes 22 and 23 respectively.

What is claimed is:

1. A circuit for suppressing amplitude variations of electrical signal oscillations comprising a parallel resonant circuit, a transistor having base, emitter and collector electrodes, means connecting the emitter-collector path of said transistor in parallel with at least a portion of said resonant circuit, and biasing means connecting said base electrode to a point on said resonant circuit centrally disposed with respect to said portion, said biasing means comprising means preventing base current flow in said transistor until the voltage across said resonant circuit has attained a predetermined value.

2. A circuit for suppressing amplitude variations of electrical signal oscillations comprising a parallel resonant circuit, a transistor having base, emitter and collector electrodes, means connecting the emitter-collector path of said transistor in parallel with at least a portion of said resonant circuit, means comprising a resistor and a capacitor connected in parallel from said base to a point on said resonant circuit centrally disposed with respect to said portion, whereby base current of said transistor develops a constant direct voltage across said parallel connected resistor and capacitor, and means connected to the circuit between said base electrode and said point to develop a voltage therebetween for blocking base current flow when the average voltage across said resonant circuit is below a predetermined value.

3. The circuit of claim 2, in which said means for blocking base current flow comprises a source of direct voltage.

4. The circuit of claim 2, in which said transistor is a symmetrical transistor.

5. A circuit for suppressing amplitude variations of electrical signal oscillations comprising a parallel resonant circuit, a transistor having base, emitter and collector electrodes, means connecting the emitter-collector path of said transistor in parallel with at least a portion of said resonant circuit, and Zener diode means connected between said base electrode and a point on said resonant circuit centrally disposed with respect to said portion, whereby base current flow in said transistor is blocked when the voltage across said resonant circuit is below a predetermined value.

6. The circuit of claim 5, in which said transistor is a symmetrical transistor.

References Cited in the file of this patent

UNITED STATES PATENTS

| | | |
|---|---|---|
| 2,655,608 | Valdes | Oct. 13, 1953 |
| 2,885,575 | Clowen | May 5, 1959 |
| 2,928,036 | Walker | Mar. 8, 1960 |

FOREIGN PATENTS

| | | |
|---|---|---|
| 540,597 | Belgium | Feb. 16, 1956 |